Patented Jan. 1, 1952

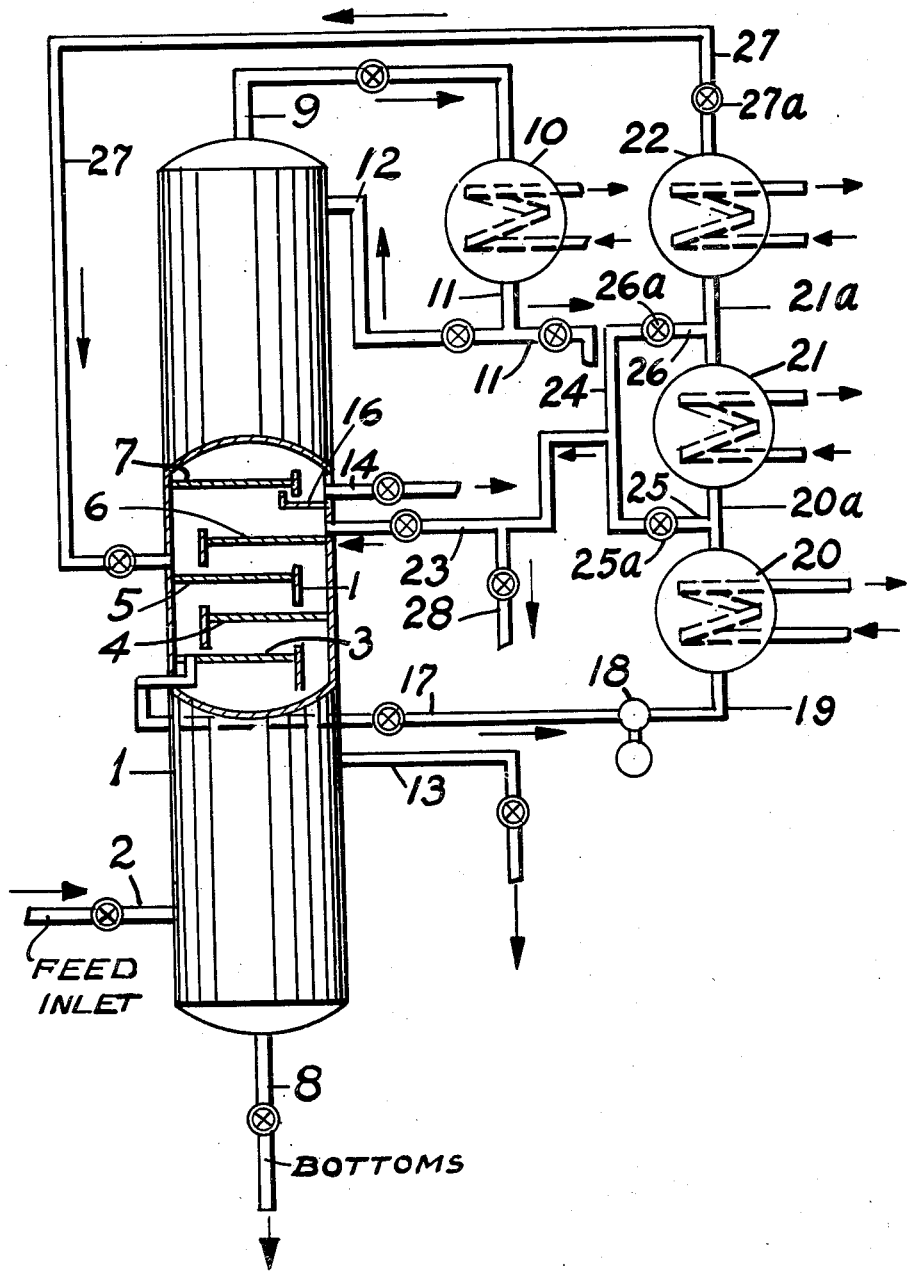

2,581,051

UNITED STATES PATENT OFFICE 2,581,051

METHOD OF OPERATING LIQUID REFLUX SYSTEMS IN FRACTIONAL DISTILLATION

Charles W. Smith, Plainfield, N. J., assignor to Standard Oil Development Company, a corporation of Delaware Application June 1, 1949, Serial No. 96,524

7 Claims. (Cl. 202—40)

The present invention relates to a method and means for improving the operation of fractionation apparatus and systems for operating the same. More particularly, the invention relates to an improvement in the operation of "pump-around" reflux systems employed in conjunction with fractionator and dephlegmator towers or other equipment in which liquid substantially in temperature equilibrium with a vapor passing through a rectifying or fractionation zone is removed from an intermediate point in the tower, cooled to a degree substantially below the equilibrium temperature, and returned to the tower at some point above that from which withdrawn. In such a system, it is conventional to withdraw a liquid from a level in the tower somewhat below the level at which a given product fraction is withdrawn, to cool the withdrawn liquid as by pumping through heat exchangers in a series, and then to return the cooled liquid at a higher level in the tower, and usually just below the level at which the product fraction is being withdrawn. The purpose of such a reflux system, primarily, is to insure proper cooling of the vapors rising through the tower to the point at which they may be readily liquefied at the next higher level and withdrawn therefrom. Ordinarily, such a system is comparatively effective for the purpose, but at high vapor rates there is a tendency for the cooled liquid reflux to be entrained by the vapors, since the viscosity of the sub-cooled reflux liquid is significantly higher than the normal viscosity of a liquid which is in equilibrium with its vapor. Consequently, at such higher vapor rates, the vapor handling capacity of the tower at the level at which the highly sub-cooled reflux is introduced may seriously limit the vapor throughput capacity of the tower. In normal operation, efforts are made to overcome this undesired tendency by increasing the circulation rate of the reflux liquid and thereby, with a given external pump and heat exchanger capacity, to maintain the temperature of the reflux liquid at a higher level.

The present invention has for its object a method and means by which substantially equivalent results may be obtained without an undue increase in the reflux pumping rate, and without increasing the temperature of the total reflux stream as re-introduced into the tower. It is also an object of the invention to minimize entrainment problems at high rates of vapor flow, and to apply such improvements as may be obtained to fractionating towers and other units such as atmospheric and vacuum pipe stills and cracking units. A further object is to improve the vapor handling capacity of any given apparatus of the type contemplated, and to provide greater operating flexibility in both new or old installations.

The invention, its objects and its advantages may be more fully understood from the following description when read in conjunction with the accompanying drawing.

The drawing illustrates the apparatus and the general flow plan of the system in a generally diagrammatic fashion, showing a fractionation tower, its related primary piping system, and the reflux pumparound conduit system contemplated according to this invention. The tower itself is illustrated partly in vertical section as required to show the operative relationship of the several elements of a typical system.

In the drawing, the numeral I designates a fractionating tower such as may be connected to a crude pipe still, as by way of the line 2, and fed therefrom. The interior of the tower is of conventional form, and is provided with a vertically spaced series of horizontal plate elements of which an intermediate group of plates 3, 4, 5, 6 and 7 are shown in the sectionalized portion of the tower. The higher boiling fractions separated from the feed may be withdrawn from the tower as by line 8, while the final and lower boiling fractions in the original feed are withdrawn as by line 9 through a heat exchanger 10. These cooled light products may then be removed as by line 11, or any desired portion recycled to the tower 1 by line 12. Intermediate products may be withdrawn as desired from intermediate levels in the tower by way of lines 13 and 14.

The several horizontal plates in tower 1, such as plates 3, 4, 5, 6 and 7, may be of any conventional construction, including bell cap plates, provided with weir and downcomer members such as may be required to maintain a desired level of liquid on each plate, and prevent bypassing of vapors upwardly through the downcomer passageways from plate to plate. As shown, the liquid overflowing the weir of plate 7 is led into a product drawoff trough or tray 16, whence a total product may be withdrawn by way of line 14. A portion of this liquid may be allowed to overflow from the trough to plate 6, under certain circumstances.

In such a substantially conventional apparatus, it is customary to reflux liquid condensate and other liquids from a plate at a level substantially below a product drawoff point to a plate at a level just below such drawoff point. Such reflux liquid may be withdrawn as from plate 3 by way of line 17 communicating with the suction side of a pump 18, the pump in turn discharging through the line 19 into the inlet of the first of a series or train of interconnected heat exchangers. The series may consist of two or more heat exchangers. A train of three exchangers 20, 21, and 22, connected discharge to inlet by lines 20a and 21a, is shown. From the last exchanger in the series the sub-cooled plate liquid is normally returned to the tower as previously described, but according to the present invention, the method and means for returning plate liquid to the tower are modified to obtain the desired improved results.

In the system, as illustrated, a conduit 23, having a valve 23a is connected at one end to intermediate points in the exchanger train or series, as to lines 20a and 21a by means of a header 24 and branch lines 25 and 26, containing valves 25a and 26a respectively. At the other end, the conduit 23 is connected to the tower 1, opening thereinto, at or above the plate 6. Preferably, the outlet of the conduit 23 opens through the tower at a point opposite the overflow weir of the plate 6.

The outlet of the last exchanger in the train, as exchanger 22, is connected to one end of a conduit 27, having a valve 27a. The conduit 27 is in turn connected at its other end to the tower 1, opening thereinto at an intermediate level between the plate from which the reflux liquid is withdrawn, and the plate receiving reflux liquid from the conduit 23. In the preferred arrangement illustrated, the conduit 27 opens into the tower at the plate 5, which is next below the one served by conduit 23. By preference also, the conduit 27 opens into the downcomer serving the selected plate, as shown. In each instance, the conduits 23 and 27 open onto the respective plates at points in the tower wall which are substantially opposite the weir elements maintaining the liquid level on the plates involved. A conduit connection 28 discharging into the line 23 may be provided for the introduction of supplementary reflux liquid, or treating solutions, as desired.

In operation of the apparatus shown, plate liquid drawn from a selected fractionation zone in the tower, as liquid from plate 3, is passed by way of line 17, pump 18, and line 19 into the first of the train or series of exchangers, such as exchanger 20 of the train 20, 21 and 22. Here the liquid is initially cooled to produce what may be termed a warm reflux liquid. A portion of this warm liquid passing from exchanger 20 to exchanger 21, by way of the connecting conduit 20a may be diverted, and withdrawn from the main stream of liquid, passing through the branch line 25 and header 24 into conduit 23, valve 25a being open and valve 26a being closed. Alternatively, the portion to be withdrawn may be diverted from the stream, after passing through the second exchanger 21, from conduit connection 21a through the branch line 26 and header 24 into conduit 23, valve 26a being open and valve 25a being closed. Also, liquid may be diverted and withdrawn through both of the conduit connections 20a and 21a to obtain blending of the diverted portions. Operating flexibility is provided, in the manner described, permitting the temperature of the reflux liquid passed through the conduit 23 to be varied over a wide range.

The liquid passed through the conduit 23 is discharged onto the selected reflux plate, such as plate 6, preferably at a point farthest removed from the plate outlet provided by the weir and downcomer associated therewith. This point of introduction or discharge, in any instance, may be termed the plate inlet. The reflux liquid thus introduced, plus condensate and a treating solution, where used, flows downwardly from plate to plate in the zone.

That portion of the plate liquid stream remaining after initial diversion and withdrawal of a part thereof in the fashion described, may be then further cooled, passing through the conduit 27, to be introduced into the zone at the inlet side of a plate intermediate the plate onto which the warm reflux liquid is discharged, and the plate from which the initial liquid stream is withdrawn. In the preferred form shown, the remaining reflux liquid is introduced from the line 27 onto the plate 5, next below that receiving the discharge of warm reflux liquid from conduit 23. Also, as shown, the reflux liquid from conduit 27 is discharged into the downcomer from plate 6 serving plate 5.

By introducing the initial, or diverted portion of the plate liquid withdrawn from the tower onto an upper plate in a given fractionation zone of the tower, as a warm or only partially cooled reflux liquid, the temperature of the liquid on that plate is not so reduced as to greatly increase its viscosity. By variation of the quantity of liquid passed through the lines 23 and 27 respectively, and by proper proportioning of the quantities of liquid withdrawn intermediate the initial and final stages of a given exchanger train, an optimum temperature and viscosity relationship may be established in the liquids flowing over the final plate or plates in the given zone. Liquid entrainment at high vapor flow rates thus will be minimized, or limited, if it does occur, to those stages in the zone lying below that at which sub-cooling of the liquid contents of a plate is a critical factor in determining the vapor flow rate, and overall efficiency of the operation.

What is claimed is:

1. A method for fractionating vaporized liquid materials, in which liquids, including a condensate of said materials, are passed downwardly through a fractionation zone and vapors upwardly therethrough in countercurrent relation, a product fraction of said materials being withdrawn from a selected level in said zone as a liquid condensate, which comprises withdrawing a portion of said liquids as a stream of liquids from a selected level in the zone, substantially below that at which a product fraction is withdrawn, initially cooling said stream by heat exchange, withdrawing a portion of the initially cooled stream, returning said portion as reflux to a level in said zone substantially above the level from which the initial stream is withdrawn, but below that at which said product fraction is withdrawn, further cooling the remainder of said stream and returning the further cooled remainder as reflux to a level in said zone intermediate the level of initial withdrawal of the stream and the level at which the initially cooled portion is returned to said zone.

2. A method according to claim 1 in which the further cooled remainder of said stream is returned as reflux to said zone at a level immediately below the level at which said initially cooled portion is returned to said zone.

3. A method according to claim 1 in which the initially cooled stream portion is returned to the zone at a level immediately below that at which a product fraction is withdrawn from the zone as liquid condensate.

4. In a method of fractionating vaporizable materials in a fractionating tower, in which said materials are passed upwardly as vapors through said tower in countercurrent relation to a liquid, including a condensate of said vapors, flowing downwardly through said tower, product fractions of said materials being withdrawn from a series of fractionation zones in said tower as vapor condensate, the steps which comprise withdrawing a stream of said liquid from a fractionation zone in said tower, from a level in said zone substantially below that at which a product fraction is withdrawn, passing the stream of liquid withdrawn through a successive series of heat exchange zones, cooling said stream, diverting portions from the stream during passage through said heat exchange zones intermediate the initial and final zones in the series thereof, and returning said portions to the zone, from which the stream is withdrawn, at a level substantially above the level of original withdrawal, and below that at which said product fraction is withdrawn, passing the remaining portions of said stream through the remaining heat exchange zones in said series, further cooling the stream, and returning said further cooled, remaining portion of the stream to the zone from which withdrawn at a level therein intermediate the level of withdrawal of the original stream and the higher level at which the portions diverted from said stream have been returned thereto.

5. A method according to claim 4 in which the remaining portion of the cooled stream of withdrawn liquid is returned to the fractionation zone at a level immediately below that at which the diverted portion of said stream is returned to the tower.

6. A method according to claim 4, in which the diverted portion of the originally withdrawn stream of liquid is returned to the fractionation zone at a level substantially above the level at which the stream is withdrawn, and immediately below that at which a product fraction is withdrawn from the tower as vapor condensate.

7. In a method of fractionating vaporizable materials in a fractionating tower, in which said materials are passed upwardly as vapors through said tower in countercurrent relation to a liquid, including a condensate of said vapors, flowing downwardly through said tower, and in which liquid condensate is withdrawn as a product fraction from said tower, the steps which comprise withdrawing a stream of tower liquid flowing downwardly through the tower from an intermediate level below that at which a product fraction is withdrawn, passing said stream into heat exchange relation to a cooling fluid exteriorly of said tower in a successive series of connected heat exchange zones, withdrawing portions from said stream intermediate the initial and final zones in said series of heat exchange zones, as a partially cooled liquid reflux, passing the remaining liquid in said stream through the remainder of said heat exchange zones, re-introducing the partially cooled liquid reflux into said tower at a level immediately below a point of withdrawal for said liquid condensate product fraction, and re-introducing the remaining portion of the liquid stream originally withdrawn from the tower at a level in said tower intermediate the original withdrawal level, and the level of re-introduction of the partially cooled portion of said stream, each of said portions being combined with the tower liquid at their respective levels of re-introduction.

CHARLES W. SMITH.

REFERENCES CITED

The following references are of record in the file of this patent:

UNITED STATES PATENTS

| Number | Name | Date |
| --- | --- | --- |
| 1,744,421 | Stroud et al. | Jan. 21, 1930 |
| 1,991,792 | Coubrough | Feb. 19, 1935 |